March 7, 1961
W. B. GREEN ET AL  2,973,628
REMOVAL OF CARBON MONOXIDE FROM ETHYLENE
Filed May 29, 1958
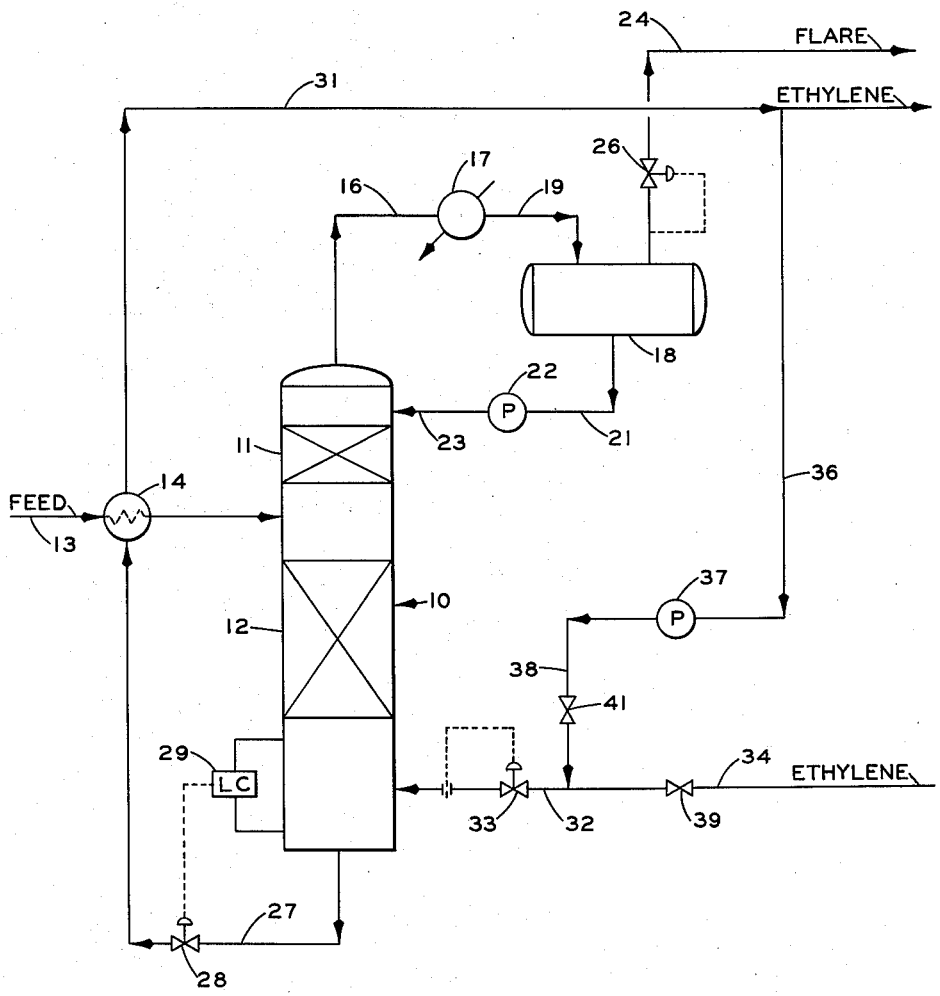
INVENTORS
W. B. GREEN
V. E. GAEDE
BY Hudson and Young
ATTORNEYS

United States Patent Office 2,973,628
Patented Mar. 7, 1961

2,973,628

REMOVAL OF CARBON MONOXIDE FROM ETHYLENE

William B. Green and Virgil E. Gaede, Pasadena, Tex., assignors to Phillips Petroleum Company, a corporation of Delaware Filed May 29, 1958, Ser. No. 738,851

1 Claim. (Cl. 62—24)

This invention relates to removal of carbon monoxide from ethylene.

At the present time many types of polyethylene are available, prepared by different catalyst systems. For most of these catalyst systems, and especially the newer organo-metal systems, the ethylene used must be very pure. One of the impurities which will greatly decrease catalyst activity is carbon monoxide. Therefore, a great deal of work has been done in devising new and improved ethylene purification processes.

Due to the high vapor pressure of ethylene and its low vaporization temperature such separations are generally carried out at low temperatures. When so operated, there is a considerable problem in reboiling apparatus used for fractionation. The temperatures are so low that steam cannot be used and indirect heat exchange is difficult because of the large temperature exchange surfaces involved.

The present invention is based upon the discovery that ethylene itself is a very satisfactory gas for supplying the heat necessary to reboil a fractionation column. There is no question of contamination and this gas for this separation is greatly superior in the output obtainable. A gas of lower volatility than ethylene would appear in the kettle product and require subsequent separation. A gas of higher volatility than ethylene would mean subsequent loss of some ethylene in the overhead product.

The following are objects of our invention.

An object of this invention is to provide ethylene of improved purity. A further object of this invention is to provide a process for removing carbon monoxide from ethylene.

Other objects and advantages of the present invention will be apparent to one skilled in the art upon reading this disclosure, accompanying and forming a part of which, is—

A drawing showing, in schematic form, a portion of an ethylene purification plant embodying our invention.

As stated, our invention involves the removal of carbon monoxide from ethylene wherein a substantially pure ethylene stream is used to boil the column. More specifically, the invention is directed to the removal of carbon monoxide from an ethylene stream contaminated therewith wherein said contaminated stream is introduced into a fractionation zone, a gaseous overhead is produced containing substantially all the carbon monoxide, and a liquid bottoms free of carbon monoxide is produced, the improvement comprising supplying heat to the kettle portion of said fractionation zone by introducing thereinto gaseous ethylene.

The drawing illustrates the invention and attention is now directed thereto. In this drawing, the fractionation column 10 is provided with an upper packed section 11 and a lower packed section 12 although, of course, other types of columns can be used. The ethylene stream containing carbon monoxide as an impurity is supplied to column 10 by means of conduit 13 after being cooled, as hereinafter described in heat exchanger 14. An overhead fraction is removed by conduit 16, at least a portion thereof condensed in cooler 17, and thereafter passed to reflux accumulator 18 by means of conduit 19. A reflux stream is removed from the lower portion of accumulator 18 and passed by conduit 21 to pump 22 and thereafter returned to the column by means of conduit 23. Uncondensed vapors are passed from accumulator 18 through conduit 24 to a flare, this stream comprising substantially all of the carbon monoxide in the feed stream along with a small amount of ethylene. Conduit 24 is provided with valve 26, this valve regulating flow through conduit 24 to provide constant pressure in accumulator 18 so as to provide a constant pressure in fractionation zone 10. The bottom product from the fractionation zone 10 is removed through conduit 27, this removal being controlled by valve 28 and constant level controller 29. Conduit 27 connects with heat exchanger 14 to provide indirect heat exchange with the feed and thereafter pass through conduit 31 for further purification. Gaseous ethylene is supplied to the kettle portion of fractionation zone 10 by means of conduit 32, this conduit having valve 33 therein to provide a constant rate of flow therethrough to provide a constant amount of heat to the column. The dry gaseous ethylene can be supplied from any suitable source in the purification, a line 34 being shown for this delivery. In one modification, a portion of the ethylene in conduit 31 can be bypassed from this line through conduit 36 to pump 37 and thereafter to conduit 32 through conduit 38. Valves 39 and 41 are provided to permit selection of the ethylene stream.

The following example illustrates a specific embodiment of our invention but, obviously, other temperatures, pressures, and rates of flow could be used.

Example

The following material balance illustrates the flow for our invention wherein an ethylene stream is available at a pressure of 400 p.s.i.a. and at a temperature of 100° F., amounts being given in pounds per day.

| Component | Conduit | | | |
|---|---|---|---|---|
| | 13 | 27 | 24 | 34 |
| $CH_4$ | 193 | 134 | 64 | 5 |
| $C_2H_2$ | 1223 | 1223 | | |
| $C_2H_4$ | 82705 | 85617 | 448 | 3360 |
| $C_2H_6$ | 1930 | 2040 | | 80 |
| $CO$ | 5 | | 5 | |
| $CO_2$ | 264 | 264 | | |

For this operation, the column is operated at 315 p.s.i.a with a top temperature of $-16°$ F. and a kettle temperature of $-15°$ F. The feed in line 13 is supplied at 400 p.s.i.a. and 145° F. In heat exchanger 14 the feed is cooled to 0° F. and there is a 10 p.s.i.a pressure drop. The ethylene in line 27 is heated from the kettle temperature to 99° F., the pressure, after the heat exchange, being 305 p.s.i.a. The overhead stream is cooled to $-25°$ F. to provide reflux. The ethylene supplied by conduit 34 is at 100° F. and 400 p.s.i.a.

The alternative arrangement is shown wherein the ethylene is supplied by conduit 36 and, after compression of this stream to 400 p.s.i.a., it is at 200° F. In such a case, 864 pounds per stream day are supplied to reboil the column.

As many possible embodiments can be made of this invention without departing from the scope thereof, it is to be understood that all matter herein set forth is to be interpreted as illustrative and not as unduly limiting the invention.

We claim:

The method of removing carbon monoxide from an ethylene stream contaminated therewith comprising, introducing said contaminated stream into a fractionation zone operated at a pressure of about 315 p.s.i.a., a bottom temperature of about −15° F. and an overhead temperature of about −16° F., producing a gaseous overhead containing substantially all of said carbon monoxide, cooling said gaseous overhead to about −25° F. and condensing at least a portion of said overhead, returning condensed overhead to the upper portion of said fractionation zone as a reflux stream, discarding a noncondensed portion of said overhead, producing a liquid bottoms containing ethylene substantially free of carbon monoxide, passing said liquid bottoms in indirect heat exchange with said contaminated stream thereby cooling said contaminated stream and vaporizing said bottoms, and supplying heat to the kettle portion of said fractionation zone by introducing thereinto gaseous ethylene.

References Cited in the file of this patent

UNITED STATES PATENTS

| | | |
|---|---|---|
| 1,870,334 | Lantz | Aug. 9, 1932 |
| 2,619,814 | Kniel | Dec. 2, 1952 |
| 2,731,810 | Hachmuth | Jan. 24, 1956 |
| 2,775,103 | Koble et al. | Dec. 25, 1956 |